UNITED STATES PATENT OFFICE.

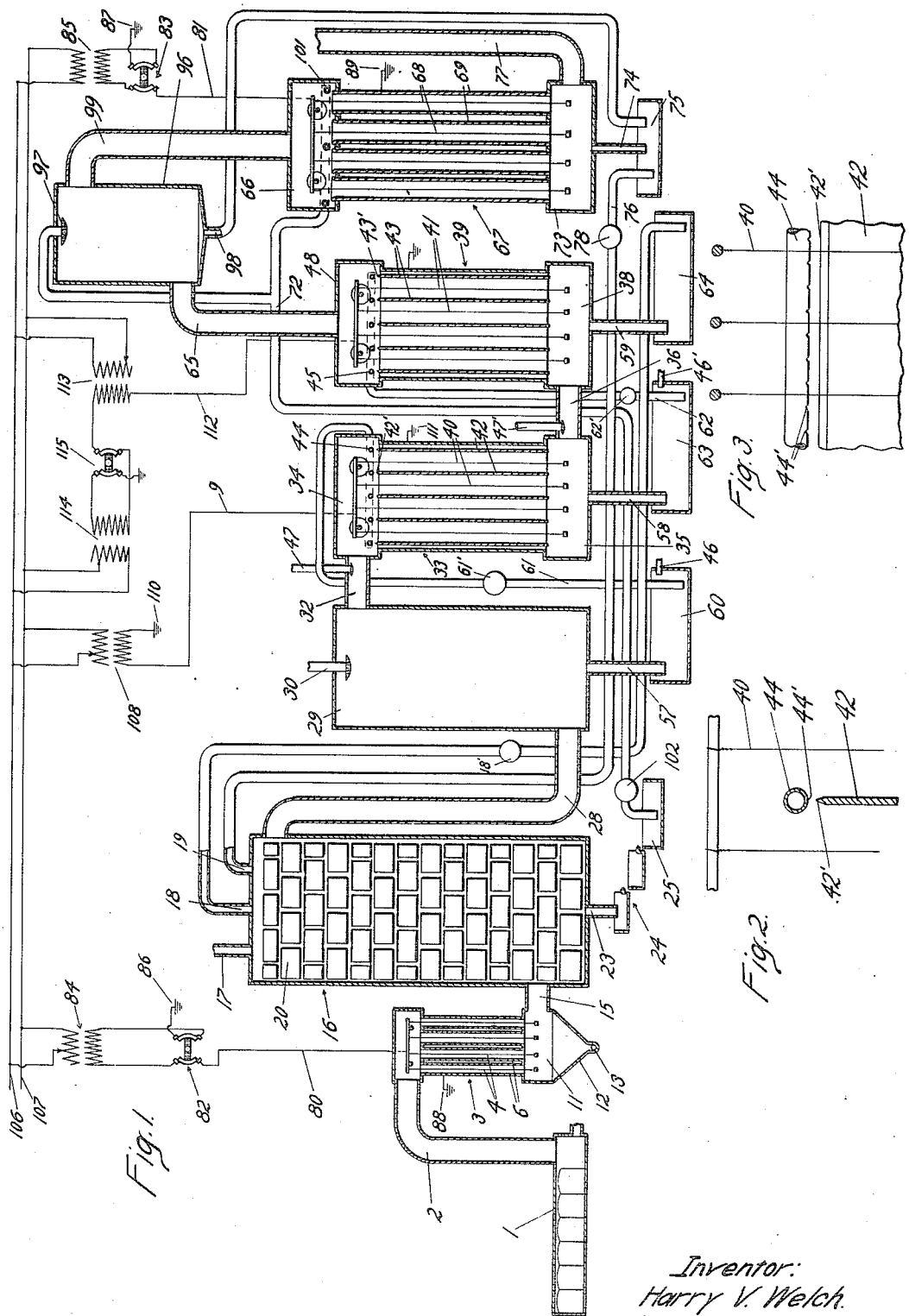

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS AND APPARATUS FOR PRODUCING SULFURIC ACID.

1,284,166.                    Specification of Letters Patent.          Patented Nov. 5, 1918.

Application filed November 22, 1916. Serial No. 132,773.

*To all whom it may concern:*

Be it known that I, HARRY V. WELCH, a citizen of the United States, residing at Los Angeles, in the county of Los Angeles and State of California, have invented a new and useful Process and Apparatus for Producing Sulfuric Acid, of which the following is a specification.

This invention relates to the manufacture of sulfuric acid by the so-called chamber process, wherein such acid is produced by reaction between sulfur dioxid, oxygen, water and compounds of nitrogen and oxygen serving as catalyzing means for the reaction. This process, as ordinarily carried out, requires the use of large and expensive apparatus, including extremely large and costly lead chambers in which the reactions mainly take place. The large dimensions of the apparatus required result from the slowness at which the necessary chemical and physical reactions are completed. Some of the essential steps in the reactions take place with comparative rapidity, under proper conditions, but the completion of the operations is delayed by failure to maintain such conditions and also by the comparatively long time required for other steps in the reactions, it being apparent that the velocity of the completed reactions can be no greater than that of the slowest step. Among the causes contributing to retard the operation, the following are of especial importance:

1. Failure to maintain the temperature at or near the optimum temperature for the reactions, (about 90 degrees C.) With the usual large lead chambers, it is not practicable to maintain approximate uniformity of temperature throughout the gases, etc., in the chambers, and in order to avoid liability of overheating by reason of the exothermic reactions taking place in such chamber, it is usual to work at temperatures very much below the optimum temperature, for example at from 50 to 60 degrees C., with the result that the velocity of reaction is only a fraction of the possible velocity.

2. Failure to provide for effective contact of the reacting substances. The water supplied to the process, either in the form of steam or of water spray, forms eventually minute drops or particles and the reaction of the sulfur dioxid and oxids of nitrogen with such water results in a condition in which reacting substances (nitrosylsulfuric acid and water or dilute sulfuric acid) are present largely in different concentration in different particles, and in order for the reaction to proceed it is necessary that particles containing nitrosylsulfuric acid in considerable concentration should be brought into contact with particles consisting substantially of water or dilute sulfuric acid, so as to complete the reaction and to form "chamber acid" as the end product. Under the usual conditions of practice, such contact of different particles suspended in the gases in the chambers takes place so infrequently and ineffectively as to seriously retard completion of the reaction.

3. Retention of end product in the reacting media. Any of the suspended liquid particles which contain the end product, sulfuric acid, in sufficient concentration to inhibit further reaction to form such end product, should be removed and replaced by water or dilute acid particles, to enable the reaction to proceed with full speed. Such removal, in the ordinary chambers, is effected simply by gravitative settling, requiring extremely large chambers so as to provide for the low velocity and prolonged time required for settling to take effect.

My present invention is directed to overcoming the above recited, and other disadvantages of the chamber process, and an important object of the invention is to provide for carrying out the necessary reactions in the most expeditious and effective manner, whereby the size of the apparatus required is greatly reduced, and the cost of installation and operation thereof is minimized. With these ends in view, my invention provides for maintaining the reacting substances at or about the most favorable temperature conditions throughout the reactions, for expediting and enforcing the mixture or contact of the reacting substances, and for removal of the end product from the region of reaction, all of these provisions tending to accelerate the reactions and to conduce to maximum output.

These objects I attain by applying an electrical field in the regions where the reactions are taking place, in such manner as to cause rapid agglomeration or precipitation of suspended particles therein, and by maintaining in such regions, extensive surfaces (preferably acting as electrodes), over which are distributed sheets of liquid acting as temperature control means.

A further object of my invention is to provide means for effective collection or retention of the oxids of nitrogen from the effluent gases, in place of, or in conjunction with, the Gay-Lussac tower usually provided for this purpose.

The accompanying drawings illustrate an apparatus suitable for carrying out my invention, and referring thereto:

Figure 1 is a longitudinal diagrammatic section of such apparatus.

Figs. 2 and 3 are detail views of the means for supplying liquid to the electrical treaters.

1 designates any means supplying sulfur dioxid together with air, for example,—a sulfur burning furnace, or a roaster or smelter in which such sulfur dioxid is a waste product. A pipe 2 leads from such means 1 to an electrical precipitator or treater 3, illustrated as of the well-known Cottrell type. As shown this precipitator is provided with discharge electrodes indicated as wires 4, and with collecting electrodes indicated as tubes or pipes 6, said electrodes being connected to suitable energizing means, so as to maintain a high potential difference between the electrodes and to set up a diffused or silent electrical field therebetween, thereby causing any dust particles present within the pipes 6 to be precipitated on the walls of said pipes. From here the dust may be allowed to fall by gravity or may be dislodged from time to time by mechanical knocking means, not shown, the precipitator or treater 3 having a lower header 11, the bottom part of which is formed as a hopper or bin 12 for receiving the material falling from the collecting electrodes. Means 13 may be provided for removal of such material from hopper 12.

A pipe 15 leads from the bottom header 11 of this precipitator to the lower part of a tower 16, which may be, as shown, of similar construction to the Glover's tower usually employed in chamber processes for the manufacture of sulfuric acid and may be provided with the usual supply means 17 for supplying nitric acid to the top of the tower, and with pipes 18 and 19 for supplying dilute or chamber sulfuric acid and nitrosylsulfuric acid respectively as hereafter described. Acid resisting bricks or tiles 20 are placed in tower 16 and the gas coming from pipe 15 passes up through the spaces between the bricks, meeting the mixture of acids introduced at the top of the tower through pipes 17, 18 and 19, said acids flowing down over the bricks or tiles 20. A pipe 23 is provided at the bottom of tower 16, to carry off the liquid from that point, which is strong or fairly concentrated sulfuric acid produced by the reactions between the gases and liquids in this tower, as hereafter described, said pipe 23 leading to a cooler 24, from which the acid flows into a tank or storage means 25.

A conduit or pipe 28 conducts the gases from the top of tower 16 to the lower part of a lead chamber 29, which is, or may be similar to the lead chambers ordinarily used in processes of this kind, (except that it is much smaller in dimensions than the usual lead chamber,) and is provided with the usual means 30 for supplying steam or a spray of finely divided water particles to the upper part of the chamber. The gases pass up through this chamber, coming in contact with the steam or fine water particles, and are partly converted into sulfuric acid (as hereafter described), some of which falls to the bottom of the chamber.

The gaseous products of the reactions taking place in chamber 29, together with some suspended water or other liquid particles, may be conducted by pipe 32 to the upper header 34 of an electrical precipitator or treater 33, the lower header 35 of which is connected by pipe 36 to the lower header 38 of a similar treater 39. In treaters 33 and 39 the discharge electrodes are shown as wires 40 and 41, and the collecting electrodes as plates 42 and 43, and said treaters are further provided with means 44 and 45 for furnishing a supply of cooled sulfuric acid to such plates 42 and 43. Said means 44 and 45 may consist of pipes extending along the top of the plates and provided with perforations 44' and 45' for causing the dilute acid to fall on knife edges 42' and 43' at the top of the plates and to be distributed evenly over both surfaces of the plates and to flow down over said surfaces in thin sheets. Treaters 33 and 39 are provided with suitable energizing means for maintaining the necessary potential difference between the discharge and collecting electrodes in the respective precipitators. Under the action of the diffused electrical fields set up in these precipitating or mixing chambers, and positioned and controlled to subject substantially the whole body of gas passing therethrough to a uniform and approximately constant electrical effect, a further quantity of sulfuric acid is formed as hereafter described, which is absorbed in the sheets of liquid flowing over the collecting electrodes and falls with said liquid to the bottom of the lower headers 35 and 38. Pipe 57 conducts the acid from the bottom of lead chamber 29 to a tank or storage means 60, which may serve as a cooler (or have a cooler connected therewith.) From said tank or cooler a pipe 61 provided with pump 61' leads to the means 44 for supplying dilute acid to the treater 33. A pipe 58 leads from bottom of treater 33 to a tank or storing and cooling means 63, whence a pipe 62 provided with a pump 62' conducts the acid to spray means or acid supply means 45 at the top of treater 39. A pipe 59 leads from bottom of treater 39 to a tank or storing and cooling means 64, from which a pipe connection 18, including a pump 18' leads to top of the Glover's tower. Suitable means may be provided as indicated at 46 and 46' for supplying water to the tanks 60 or 63 or as indicated at 47 and 47' for supplying water spray to the gases passing to the treaters 33 and 39, in such manner as to control the concentration of the acid as required.

From the upper header 48 of treater 39 a pipe 65 leads to the lower part of a second lead chamber 96, which is provided with spraying means 97, connected by a pipe 72 to tank 25, said pipe being provided with a pump 102 for causing a spray of finely divided particles of concentrated sulfuric acid from said tank to be projected into the upper part of said chamber through spraying means 97. Chamber 96 is further provided with a pipe 98 for carrying off such liquids as collect at the bottom of said chamber to another tank or storage means 75.

The upper part of chamber 96 is connected by pipe 99 to the upper header 66 of another electrical precipitator or treater 67, which performs, in conjunction with chamber 96, the function of the Gay-Lussac tower usually employed to absorb and return to the cycle the nitrogen-containing gases and other valuable constituents issuing from the last chamber. Said precipitator is provided with discharge electrodes, formed for example, as wires 68 and with collecting electrodes formed, for example, as pipes 69, said electrodes being connected to suitable energizing means to maintain a high potential difference and set up an electrical field therebetween. Suitable means, such as spray devices 101, may be provided for supplying strong sulfuric acid to this treater, said spraying means being connected, for example, to pipe 72, so that the pump 102 causes strong sulfuric acid from the tank 25 to be sprayed into said header and to flow over the edges of pipes 69 and down the inside thereof in thin sheets so as to absorb the oxids of nitrogen, etc., from the gases passing through such pipes. The nitrosylsulfuric acid so formed is conducted by a pipe 74 from the bottom header 73 of this precipitator to tank 75, from which a pipe 76, provided with a pump 78, conducts such acid to the supply means 19 for tower 16. An outlet flue 77 carries off the waste gases from bottom header 73.

Any suitable means may be used for energizing the electrical treaters above described. For example, the supports for the discharge electrodes in the treaters 3 and 67 may be connected to wires 80 and 81 leading to rectifiers 82 and 83, connected to the secondary winding of step-up transformers 84 and 85, which are connected to an alternating current circuit 106, 107, said rectifiers having ground connections 86 and 87, and the collecting electrodes 6 and 69 of said treaters being also grounded as indicated at 88 and 89, to complete the circuit. Similar connections may be provided for the treaters 33 and 39, or means may be provided whereby either or both of these treaters may be energized by alternating current or by superimposed alternating and direct current. Thus, as indicated in the drawings, the high tension conductor of treater 33 may be connected directly by wire 9 to the high tension winding of a transformer 108, whose primary winding is connected to the alternating current circuit 106, 107. Said high tension winding and the collecting electrodes 42 of said treater may be grounded as indicated at 110 and 111, to complete the circuit. The treater 39 may, as shown, be provided with electrical connections for applying superimposed alternating and direct current to its high tension conductors, the latter being connected by wire 112 to the secondary winding of a step-up transformer 113, whose primary winding is connected to the alternating current circuit 106, 107. Another transformer 114 energized by said alternating current circuit has its secondary winding connected through a rectifier 115 to the said secondary winding of transformer 113, so that rectified impulses from transformer 114 are superimposed on alternating impulses from transformer 113. Suitable provision is made for regulating the tension in the different treaters, for example by the use of adjustable transformers as indicated, so as to obtain any desired intensity of agglomerating or precipitating action in the treaters.

The collecting electrodes in the different treaters are not limited to the particular types shown in the drawings, but may in each case be either plates or pipes, or of any other suitable shape, and the discharge electrodes may also be of any suitable form.

The materials forming the structure of the electrical precipitators, chambers, connecting pipes, etc., may be any suitable acid resisting material, such as lead, its alloys, glazed porcelain or earthenware, enameled metal, etc.

The process may be carried out in the above described apparatus as follows:

The gases coming from the furnace or source of sulfur dioxid and containing air mixed with the sulfur dioxid, and also containing considerable dust, fume or suspended material, pass first through the treater or electrical precipitator 3, wherein they are subjected to the action of an electrical field, in such manner as to precipitate substantially all such dust or fume therefrom. The clean gas then passes to the Glover's tower 16, to which nitric acid is supplied by connection 17, dilute sulfuric acid, for example, chamber acid, being also supplied to the tower by connection 18, in such manner that the formation of oxids of nitrogen and the initial production of sulfuric acid proceeds in the usual manner. In accordance with usual practice, the effluent from the last unit in the apparatus corresponding to the Gay-Lussac tower, may also be conducted to the Glover's tower by connection 19, so as to restore to the reacting media the oxids of nitrogen taken up in said last unit. The comparatively concentrated sulfuric acid resulting from the reactions in the Glover's tower may be collected in the receiving means 25 in usual manner, and the remaining gases pass to the chamber 29 wherein steam or water is also supplied by means 30. The usual chamber reactions then take place in such chamber, whereby a considerable proportion of the sulfur dioxid is converted to sulfuric acid. The chamber acid so formed partly collects on the floor of the chamber by direct settling or by running down the walls and partly remains suspended in the chamber gases, in the form of fume or minute drops. The gases, containing sulfur dioxid, oxygen and nitrogen, and also carrying particles containing water, nitrosylsulfuric acid and sulfuric acid in variant proportions, pass thence to the electrical treater or precipitator 33, wherein a strong electrical field is produced by maintaining a direct or alternating potential difference on the electrodes with the result that the reactions between the various reagents present therein are accelerated by the action of the electrical field. The electrical field producing electrical discharge and electrical convection between the electrodes serves to promote the reaction by causing agglomeration of floating particles, containing the several reagents; by causing such particles to collect on the collecting electrodes 42 and to be thereby brought into effective contact with one another; and by causing convection currents which more thoroughly mix the gases. Any oxidizing agents produced by the action of the electrical field, such as ozone and oxids of nitrogen, also tend to accelerate the oxidation of the sulfur dioxid to sulfur trioxid or sulfuric anhydrid. At the same time dilute acid is supplied to the treater 33 by means 44 in such manner as to run down over the surfaces of the electrodes 42, and the electrical action in driving the particles into contact with such liquid, and in forcing the gases into such contact, by convection, also accelerates the reactions. Another important function of the body of liquid thus applied in a distributed manner throughout the gases in the treater is to control the temperature of the gases, the liquid being supplied in such quantity at such temperature that the reacting gases may be maintained nearly at the optium temperature for the reaction. A further effect of the precipitation of suspended particles on the collecting electrodes is that any end product (chamber acid) carried by any of such particles is thereby removed from the region of reaction, thus diminishing the concentration of such product in the region and correspondingly accelerating the reaction, according to the law of mass action. It will be understood that this rapid removal of the suspended particles, particularly in case a unidirectional field is used, requires or makes desirable, a correspondingly rapid supply of finely divided dilute acid to the region of reaction by the means 44 or otherwise, so as to maintain the proper concentration of the reacting substances.

If necessary, the electrical action may be repeated in another electrical treater 39, it being understood that the number of such treaters used may be varied according to special conditions. Moreover, any one or more of such treaters may be provided with means for maintaining unidirectional potential difference between the electrodes therein, so that, if desired, the gases may be first subjected to a field due to alternating potential difference and then to a field due to unidirectional potential difference, the effect of the former being largely agglomerative and that of the latter largely precipitative, a silent or diffused discharge being produced in either case.

By the operation of these treaters the reactions between the gaseous and liquid reagents are accelerated in such manner that substantially complete conversion of the sulfur dioxid, within the limits of commercial practice may be effected in a comparatively small and inexpensive apparatus.

The residual gas, containing the remaining constituents of the incoming air, with oxids of nitrogen, etc., then passes from the last treater 39 of this series of treaters, through the absorbing devices, consisting of chamber 96 and treater 67. At the top of chamber 96 a spray of cold (say 30° C.), concentrated sulfuric acid (say strength 62° Baumé) is supplied through means 97, so as to absorb the oxids of nitrogen and dissolve the nitrosylsulfuric acid particles. The mist or fume is then precipitated by the action of the electrical field within treater 67 and is absorbed in the concentrated sulfuric acid flowing over the surfaces of the collecting electrodes 69 in said treater. This concentrated sulfuric acid together with the substances absorbed therein is conducted by pipe 74 to storage means 75, whence it may be returned by pipe 76 to the top of the Glover's tower 16. The sheets of liquid flowing over the surface of the collecting electrodes 69 also serve to control the temperature in treater 67 and to preserve it at about the optimum point for such absorption. These absorbing devices may, as shown, take the place of a Gay-Lussac tower, or they may be supplemented by a Gay-Lussac tower of usual construction, or, if desired, such Gay-Lussac tower may be used in place of said absorbing devices.

In order to more fully explain the manner in which the reactions are expedited by the operations above described, it may be stated that two successive reactions take place within the lead chambers, the first between a liquid water particle and the three reacting gases, oxygen, sulfur dioxide and oxids of nitrogen entering the chamber, and the second between two liquid or non-gaseous but chemically different particles which react only after coalescing, thus being a reaction entirely in the liquid phase. It will be understood that the effect as regards reaction velocity is substantially the same in the case of solid particles as in the case of liquid particles, and when the term liquid is applied to particles with reference to such reaction velocity, such term includes non-gaseous particles—(for example, nitrososulfuric acid particles) which may, under certain conditions, be solid.

Disregarding the various intermediate formulæ which have been offered, the following equations may be taken as satisfying the *rationale* of the process for the primary lead chamber reaction:

$$2SO_2 + NO + NO_2 + O_2 + H_2O \xrightarrow{\text{(very fast)}} 2SO_5NH$$
Gas. Gas. Gas. Gas. Liquid. Liquid.

The union of the gases with the liquid, a heterogeneous reaction, is an extremely rapid reaction, due to the very high rate of diffusion of the gaseous particles, which are also very rapidly absorbed by the liquid water particles, and it may be assumed in normal operation (with the presence of considerable moisture or $H_2O$) that very shortly after the entrance of the gases to the chamber from the Glover's tower, a small fraction only of the $SO_2$ exists in its free state as gaseous $SO_2$, while the larger portion is to be accounted for in the chamber acid on the floor of the chamber, and in three kinds of liquid floating particles, namely, $SO_5NH$ (nitrosylsulfuric acid), particles of dilute $H_2SO_4$, and particles of concentrated $H_2SO_4$ of the composition of the chamber acid, but which have not yet settled upon the chamber floor.

The second reaction, a homogeneous reaction in liquid phase, becomes possible only with the coalescing of a water particle, or a dilute sulfuric acid particle, with a nitrosylsulfuric acid particle. The velocity of the reaction is, therefore, dependent upon physical condition and physical contact of the two chemically different particles, and briefly may be put into the following formula:

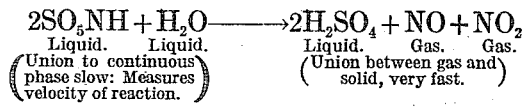

Other equations have been proposed, for example:

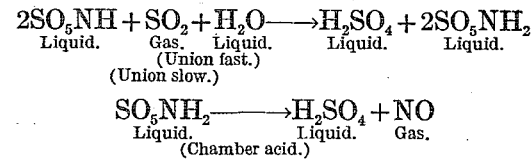

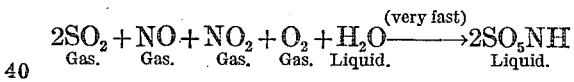

But here since the rate of diffusion of the gas $SO_2$ is fast, the rate of $H_2SO_4$ formation is still dependent upon the union within a single liquid phase of the floating particles of liquid, $SO_5NH$ (nitrosylsulfuric acid) and $H_2O$ (water).

An adequate supply of sulfur gas, oxids of nitrogen and water vapor being present in the gas volume entering the first lead chamber from the Glover's tower, the capacity or rate of formation of acid is affected by five conditions or variables, the control or attainment of which has been the subject of many proposed mechanical and chemical improvements, and it is the application of new and novel means, namely a suitably arranged high potential electric discharge, to accomplish chemical, mechanical and heat requirements necessary to secure maximum velocity of acid production, which is the subject of this invention.

To further the understanding of the above described process, and to illustrate how, by its means, I am able to exactly control factors and conditions of capacity and production, only in part heretofore under control, I will briefly recount the nature of these variables, and the means which our improvements provide for their control. They may be stated as follows:

(1) Velocity of acid production is at a maximum in the neighborhood of 90° C., or the optimum temperature for conversion is 90° C.

(2) Velocity of acid production is primarily dependent on rate of diffusion or rate of mechanical contact of non-gaseous particles of $SO_5NH$ (nitrosylsulfuric acid) and $H_2O$ or dilute $H_2SO_4$.

(3) Velocity of acid production is dependent upon rate of coalescing into a single liquid phase of two non-gaseous particles, nitrosylsulfuric acid and water or dilute sulfuric acid, after having come into mechanical contact, as stated in (2) and floating about as twin particles.

(4) Velocity of acid production is dependent on rate of removal of particles of chamber acid formed. The process equation determining the rate of acid production has been stated as:

$$2SO_5NH + H_2O \rightarrow 2H_2SO_4 + NO + NO_2$$

This, however, is a reversible reaction, and using the symbols of physical chemistry, the equation is more accurately presented:

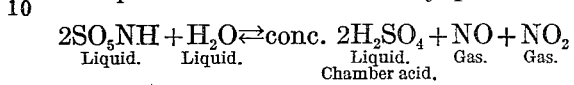
$$2SO_5NH + H_2O \rightleftharpoons \text{conc. } 2H_2SO_4 + NO + NO_2$$
Liquid.  Liquid.  Liquid. Chamber acid.  Gas.  Gas.

Since the rate of diffusion of gas particles within the chambers is so very great in comparison with the movement and union of the solid particles, the gaseous constituents may in stating the condition of equilibrium be regarded as of constant value and the equilibrium equation may be expressed in the following form:

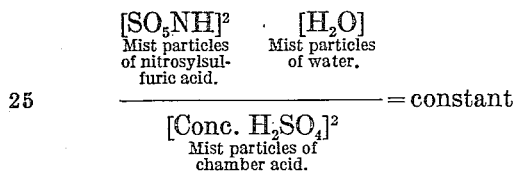
$$\frac{[SO_5NH]^2 \cdot [H_2O]}{[\text{Conc. } H_2SO_4]^2} = \text{constant}$$

where $[SO_5NH]^2$ = Mist particles of nitrosylsulfuric acid, $[H_2O]$ = Mist particles of water, $[\text{Conc. } H_2SO_4]^2$ = Mist particles of chamber acid.

Interpreting the above equation and realizing the condition that the chamber acid produced must not be too dilute and must not be so concentrated as to absorb the oxides of nitrogen, that is, that the relative amount of water is fixed, it is evident that the relative rate of removal of the concentrated $H_2SO_4$ mist or particles measures the rate velocity of acid formation.

(5) Much heat is released in the oxidation of $SO_2$, as indicated by the equation:

$$2SO_2 + 3O_2 \rightleftharpoons 2SO_3 + 2O_2 + 22600 \text{ cal.}$$

and since the optimum temperature stated in (1) is about 90° C., the velocity of acid production falling off both above this temperature (due to disappearance of water particles) and below this temperature (since in general a 10° C. increase in temperature doubles the reaction velocity), the velocity of acid production may be stated as proportional to the ability of the plant apparatus to absorb or conserve heat, so that the products entering into and resulting from the lead chamber reaction are near 90° C.

Having briefly described the conditions to be met, I will now proceed to show wherein my improved process provides for a more exact control of conditions than has hitherto been obtained. It will be understood that in this process, as in other chamber processes for the manufacture of sulfuric acid, a large part of the reactions between the constituents entering the Glover's tower takes place in this tower and in the first lead chamber 29. Lunge states that at approximately 30 ft. from the entering end 70% of the $SO_2$ has disappeared from the gaseous form and appears in the following forms: as condensed chamber acid on the floor of the chamber; as mist of chamber acid floating in the chamber acid; and as nitrosylsulfuric acid, also floating in the chamber gases.

The gases from chamber 29, carrying in suspension particles of $SO_5NH$, $H_2O$, and dilute $H_2SO_4$ and chamber acid in the form of mist, are subjected in electrical precipitator or treater 33 to a high potential electrical discharge. Since the main function here is to agglomerate the particles of $SO_5NH$ and $H_2O$, or dilute $H_2SO_4$, so that they will be within the same liquid phase, thus enabling an inter-reaction to take place, the current applied may be alternate current or direct current, or essentially direct current, or an alternate current superimposed upon a direct current. The sheet of dilute $H_2SO_4$ flowing over the surface of the plates 42 serves to absorb both the heat of reaction and the products of reaction, and by proper adjustment of rate of flow makes possible the maintenance of constant and desired temperature in the gases passing through the treater, and by adjustment of its concentration as it enters the top of the treater permits the discharge at the bottom of the treater of acid of the usual lead chamber concentration. Due to the shift in equilibrium as shown in equation, $$\frac{[SO_5NH]^2 \cdot [H_2O]}{[H_2SO_4]^2} = K.$$

and also to extend the capacity for heat absorption, it may be desirable to remove the chamber acid mist successively, as provided for by the second treater 39 and any number of additional treaters desired. In ordinary chamber operation, since the acid produced must be of a definite strength, it is seen from the above equilibrium equation, that it is not feasible to supply sufficient water to entirely decompose the nitrosylsulfuric acid particles [$SO_5NH$], so that the gases leaving the last chamber still contain floating particles of $SO_5NH$. In this process, less of this compound leaves treater 39 of the last treater in this series, and more of the nitrogen compound in the form of the gaseous oxides of nitrogen.

The gases leaving treater 39, and carrying gaseous oxides of nitrogen and some nitrosylsurfuric acid must then pass to the final absorbing treater 67, where these and other valuable constituents are removed for returning to the Glover's tower as above described.

It will be understood that the illustration of the apparatus in the accompanying drawings is diagrammatic, no attempt being made to show the detail construction and

What I claim is:

1. The process of making sulfuric acid which consists in producing a mixture comprising sulfur dioxid, oxygen, oxids of nitrogen and water, said mixture consisting of gases in which are suspended non-gaseous particles, and subjecting such mixture to the action of a diffused electrical field in such a manner as to produce an electrical discharge throughout the mixture and to cause agglomeration of non-gaseous particles and bring about reaction between the constituents thereof.

2. The process of producing sulfuric acid which consists in producing a mixture comprising sulfur dioxid, oxygen, oxids of nitrogen and water, said mixture consisting of gases in which are suspended non-gaseous particles, and subjecting such mixture to the action of a high potential unidirectional electrical field to cause precipitation of such suspended particles and consequent contact and reaction of the constituents thereof.

3. The process of making sulfuric acid which consists in producing a mixture comprising sulfur dioxid, oxygen, oxids of nitrogen and water, said mixture consisting of gases in which are suspended non-gaseous particles, and passing such mixture in contact with a vertically flowing body of dilute sulfuric acid, said body of acid being in such volume and at such temperature and being so exposed to the mixture, as to maintain such mixture substantially at the optimum temperature for the reactions required in the formation of sulfuric acid, and maintaining a high tension unidirectional electrical field in the gases while they are in contact with such body of dilute sulfuric acid, in such manner as to precipitate suspended non-gaseous particles into such body of liquid and to produce electrical convection in said gases and thereby bring the gases effectively into contact with such body of liquid.

4. The method of accelerating the reactions required in the production of sulfuric acid by the reaction of sulfur dioxid, oxygen, oxids of nitrogen and water, which consists in subjecting the mixture of such agents to the action of a high potential diffused electrical field in such manner as to produce an electrical discharge throughout the mixture and to cause non-gaseous particles to be brought into reactive relation in a continuous liquid phase.

5. The process of accelerating reaction between constituents of liquid or other non-gaseous particles suspended in gaseous media, which consists in causing said particles to be brought into continuous liquid phase relation by the action of a high potential, diffused electrical field.

6. The process of accelerating reaction between constituents of liquid or non-gaseous particles suspended in gaseous media which consists in subjecting such gaseous media, with the particles therein suspended, to the action of a high potential alternating field superposed on a unidirectional field, in such manner as to cause agglomeration and precipitation of the non-gaseous particles and their coalesence into continuous liquid phase to produce the required reaction.

7. The method of accelerating the reaction between sulfur dioxid, oxygen, oxids of nitrogen and water, to form sulfuric acid, which consists in subjecting the mixture of such reagents to the action of a diffused electrical field in such manner as to remove the end product of reaction, namely, sulfuric acid mist, and thereby increase the velocity of reaction by decreasing the concentration of the end product.

8. The method of accelerating the reaction between sulfur dioxid, oxygen, oxids of nitrogen and water to form sulfuric acid, which consists in passing the mixture of such reagents in contact with a body of liquid maintained at a temperature approximating the optimum temperature for the reaction, and passing an electrical discharge into such mixture to cause convection currents for bringing the mixture and the products of reaction into contact with such body of liquid.

9. The method of accelerating the reaction between constituents contained in a gaseous medium, which consists in bringing said medium in contact with a moving liquid body maintained at approximately the optimum temperature for reaction, and maintaining an electrical discharge in said medium to produce convection currents tending to enforce contact of such medium with the liquid body.

10. The method of accelerating the reaction in production of sulfuric acid by the chamber process and of localizing the reaction in a region of limited extent, which consists in passing a diffused electrical discharge through the reacting media, resulting in coalescing and precipitation of non-gaseous particles and removal of end-product of the reaction, and in continuously supplying the reagents at the same rate they are removed by the reaction and by the removal of end product.

11. The method of removing oxids of nitrogen and fumes from the effluent of the chamber process of making sulfuric acid which consists in bringing such effluent in contact with strong sulfuric acid, and at the same time subjecting it to the action of an electrical field to cause precipitation of fume.

12. The method of removing oxids of nitrogen and fumes of sulfuric acid and nitrosylsulfuric acid from the effluent of the chamber process of making sulfuric acid, which consists in passing such effluent between electrodes between which a high tension electrical field is maintained in such manner as to cause precipitation of suspended particles onto said electrodes.

13. The process of making sulfuric acid from gases containing sulfur dioxid and oxygen together with non-gaseous material suspended therein, which consists in separating such non-gaseous suspended material by the action of an electrical field, then mixing the gases with a gaseous catalytic oxidizing agent and with water, and subjecting the mixture to the action of an electrical field to accelerate the production of sulfuric acid and then exposing the residual gases to contact with a moving body of absorbent liquid to absorb the catalytic agent and at the same time producing an electrical field within the gases to accelerate absorption and to precipitate fumes.

14. The method of removing oxids of nitrogen and fumes from the effluent of the chamber process of making sulfuric acid, which consists in distributing strong sulfuric acid into such effluent and passing the remaining gases through an electrical field to precipitate the fumes therefrom.

15. The method of controlling the reactions in the chamber process of making sulfuric acid, which consists in subjecting the reacting media successively to the action of a plurality of electrical fields, said electrical fields being of sufficient intensity to cause coalescence and precipitation of liquid particles of different constitution and to thereby accelerate the reactions.

16. The method of controlling the reactions in the chamber process of making sulfuric acid, which consists in subjecting the reacting media successively to the action of a plurality of electrical fields and at the same time passing bodies of liquid in contact with said reacting media to control the temperature therein.

17. In an apparatus for making sulfuric acid by the chamber process, a source of gases containing sulfur dioxid and oxygen, means for bringing such gases into reaction with oxids of nitrogen and water, and means for passing all of such gases, together with the suspended products of the reactions thus brought about to the action of a diffused electrical field to remove such products from suspension, and to bring suspended particles into contact so as to accelerate the reactions.

18. In an apparatus for making sulfuric acid by the chamber process, means for producing a mixture of gases containing sulfur dioxid, oxygen and oxids of nitrogen and non-gaseous suspended particles containing water and products of reaction, a chamber adapted to receive such mixture and provided with electrode means and with means for passing aqueous liquid over such electrode means and with other electrode means having high tension electrical supply connections for maintaining an electrical field between said electrode means.

19. In an apparatus for making sulfuric acid by the chamber process, means for producing a mixture of gases containing sulfur dioxid, oxygen and oxids of nitrogen, and non-gaseous suspended particles containing water and products of reaction, a chamber adapted to receive such mixture and provided with means for subjecting the same to the action of an alternating electrical field so as to produce agglomeration of the non-gaseous suspended particles and cause them to react, and a second chamber adapted to receive the mixture of gases and suspended particles from the first chamber and provided with means for subjecting such mixture to the action of an unidirectional field so as to separate the suspended particles from the gases.

20. In an apparatus for making sulfuric acid by the chamber process, means for removing oxids of nitrogen and fumes from the gaseous effluent of said process, said means comprising a chamber adapted to receive such gaseous effluent and provided with means for introducing concentrated sulfuric acid to absorb said oxids of nitrogen and means for subjecting the gaseous effluent in said chamber and the non-gaseous particles suspended therein to the action of an electrical field to precipitate said non-gaseous particles.

21. Apparatus for removing oxids of nitrogen and fumes from the effluent of the chamber process of making sulfuric acid, comprising a gas receiving chamber provided with means for passing such effluent therethrough, collecting electrodes in said chamber, discharge electrodes in said chamber, means for maintaining a high potential difference between said electrodes to produce electrical discharge and to cause precipitation of fume on the collecting electrodes, and means for passing strong sulfuric acid over said collecting electrodes to absorb the fumes and oxids of nitrogen.

In testimony whereof I have hereunto set my hand, at Los Angeles, California, this 17th day of November, 1916.

HARRY V. WELCH.